United States Patent
Braegger

(10) Patent No.: US 12,048,958 B2
(45) Date of Patent: Jul. 30, 2024

(54) MOBILE PIPE FUSING PLATFORM APPARATUS, SYSTEM, AND METHOD

(71) Applicant: Whitaker Construction Co. Inc., Brigham City, UT (US)

(72) Inventor: Kenton Braegger, Brigham City, UT (US)

(*) Notice: Subject to any disclaimer, the term of this patent is extended or adjusted under 35 U.S.C. 154(b) by 0 days.

(21) Appl. No.: 18/078,637

(22) Filed: Dec. 9, 2022

(65) Prior Publication Data

US 2024/0189883 A1 Jun. 13, 2024

(51) Int. Cl.
| B23K 37/00 | (2006.01) |
| B21D 39/04 | (2006.01) |
| B23P 19/04 | (2006.01) |
| B23Q 3/18 | (2006.01) |
| B23K 101/10 | (2006.01) |

(52) U.S. Cl.
CPC .............. *B21D 39/04* (2013.01); *B23K 37/00* (2013.01); *B23P 19/04* (2013.01); *B23Q 3/186* (2013.01); *B23K 2101/10* (2018.08)

(58) Field of Classification Search
CPC .................. B23K 11/0935; B23K 37/0533
See application file for complete search history.

(56) References Cited

U.S. PATENT DOCUMENTS

| 1,726,347 A | * | 8/1929 | Gross | B21C 37/08 |
| | | | | 228/19 |
| 1,788,833 A | * | 1/1931 | Haughey | B21C 37/08 |
| | | | | 228/17 |
| 1,922,913 A | * | 8/1933 | Free | B23K 11/0935 |
| | | | | 219/61.4 |
| 6,220,498 B1 | * | 4/2001 | Gordon | B23K 37/0533 |
| | | | | 228/44.5 |
| 8,740,312 B1 | | 6/2014 | Lowery | |
| 10,967,582 B1 | * | 4/2021 | Abatie | B29C 31/002 |
| 2001/0033773 A1 | * | 10/2001 | Baugh | F16L 1/207 |
| | | | | 405/177 |

FOREIGN PATENT DOCUMENTS

| CN | 112606404 A | 4/2021 |
| CN | 114193775 A | 3/2022 |

OTHER PUBLICATIONS

Computer English translation CN112606404A (Year: 2023).*
Matos "PCT International Search Report for International Application No. PCT/US2022/052455" mailed Mar. 17, 2023, 2 pages.
Matos "Written Opinion of the International Searching Authority for International Application No. PCT/US2022/052455" mailed Mar. 17, 2023, 7 pages.

* cited by examiner

*Primary Examiner* — Erin B Saad
(74) *Attorney, Agent, or Firm* — Intellectual Strategies

(57) ABSTRACT

A mobile pipe fusion assembly system includes a fusion machine skid comprising a flat cross-sectional area whereon a pipe fusion machine rests, a forward skid comprising a flat cross-sectional area whereon a first pipe stand rests, and a rear skid comprising a flat cross-sectional area whereon a second pipe stand rests. The fusion machine skid is coupled to the forward skid by a first coupling. The fusion machine skid is coupled to the rear skid by a second coupling. The system is configured such that when the forward skid is pulled along a length of the pipe, the forward skid pulls the fusion machine skid via the first coupling and the fusion machine skid pulls the rear skid via the second coupling.

13 Claims, 6 Drawing Sheets

MOBILE PIPE FUSING PLATFORM APPARATUS, SYSTEM, AND METHOD

FIELD OF THE INVENTION

The present invention relates to a mobile pipe skid fusing assembly and more specifically, to an overall system and method for placing and fusing pipe lengths using a mobile pipe fusing platform or skid.

BACKGROUND

The placement and fusing of large pipes can be time-consuming and difficult. In a typical system and method, large pipes need to be fused together in long sections. Typical pipe fusion machine setups are stationary. That is, the fusion machine is located in a particular location. The pipes are then dragged through the fusion machine to be fused together and constructed in a long section. The long section is then dragged by heavy machinery to its destination. Such dragging can be detrimental to the pipes and there is potential for damage to occur during the dragging process.

In addition, the large stationary pipe fusion machine setups need to go through a teardown process and then rebuilt in another location when a large section of pipe is laid and dragged into position. Such a teardown process and reset of the stationary pipe fusion machine takes time and manpower to do. Such teardowns and resets can be costly and may include inspection every time to make sure that all parts and systems have been properly constructed which adds further time to the overall pipe fusing process.

Disclosed herein are embodiments of a mobile pipe fusing apparatus, system, and method that overcomes many of the deficiencies that are present in existing stationary pipe fusing machine setups. Embodiments include various features that help for a more efficient and consistent process to allow for quick and repeatable pipe fusion that eliminates time consuming teardown and reset processes and the dragging of pipe over long distances.

SUMMARY

The subject matter of the present application has been developed in response to the present state of the art, and in particular, in response to the problems and disadvantages associated with conventional systems that have not yet been fully solved by currently available techniques. Accordingly, the subject matter of the present application has been developed to provide embodiments that overcome at least some of the shortcomings of prior art techniques.

Disclosed herein is a mobile pipe fusion assembly system. The system includes a fusion machine skid comprising a flat cross-sectional area whereon a pipe fusion machine rests, a forward skid comprising a flat cross-sectional area whereon a first pipe stand rests, and a rear skid comprising a flat cross-sectional area whereon a second pipe stand rests. The fusion machine skid is coupled to the forward skid by a first coupling. The fusion machine skid is coupled to the rear skid by a second coupling. The system is configured such that when the forward skid is pulled along a length of the pipe, the forward skid pulls the fusion machine skid via the first coupling and the fusion machine skid pulls the rear skid via the second coupling. The preceding subject matter of this paragraph characterizes example 1 of the present disclosure.

The system includes the pipe fusion machine. The preceding subject matter of this paragraph characterizes example 2 of the present disclosure, wherein example 2 also includes the subject matter according to example 1, above.

The system includes the first and second pipe stands. The first pipe stand is coupled to the forward skid and the second pipe stand is coupled to the rear skid. The preceding subject matter of this paragraph characterizes example 3 of the present disclosure, wherein example 3 also includes the subject matter according to any one of examples 1-2, above.

The pipe fusion machine is coupled to the fusion machine skid. The preceding subject matter of this paragraph characterizes example 4 of the present disclosure, wherein example 4 also includes the subject matter according to any one of examples 1-3, above.

The fusion machine skid, the forward skid, and the rear skid each comprise a forward raised lip. The preceding subject matter of this paragraph characterizes example 5 of the present disclosure, wherein example 5 also includes the subject matter according to any one of examples 1-4, above.

The first coupling comprises two tethers attached on a rear position of the forward skid at a single location and attached at two locations on a forward position of the fusion machine skid. The preceding subject matter of this paragraph characterizes example 6 of the present disclosure, wherein example 6 also includes the subject matter according to any one of examples 1-5, above.

The second coupling comprises two tethers attached on a rear position of the fusion machine skid at a single location and attached at two locations on a forward position of the rear skid. The preceding subject matter of this paragraph characterizes example 7 of the present disclosure, wherein example 7 also includes the subject matter according to any one of examples 1-6, above.

The tethers are configured to transfer a tensile load and do not transfer a compressive load. The preceding subject matter of this paragraph characterizes example 8 of the present disclosure, wherein example 8 also includes the subject matter according to any one of examples 1-7, above.

The system further includes a canopy covering the pipe fusion machine. The canopy is coupled to the fusion machine skid. The preceding subject matter of this paragraph characterizes example 9 of the present disclosure, wherein example 9 also includes the subject matter according to any one of examples 1-8, above.

Disclosed herein is mobile pipe fusion apparatus for fusing a pipe. The apparatus includes a fusion machine skid comprising a flat cross-sectional area whereon a pipe fusion machine rests, a forward skid comprising a flat cross-sectional area whereon a first pipe stand rests, and a rear skid comprising a flat cross-sectional area whereon a second pipe stand rests. The fusion machine skid is coupled to the forward skid by a first coupling. The fusion machine skid is coupled to the rear skid by a second coupling. The system is configured such that when the forward skid is pulled along a length of the pipe, the forward skid pulls the fusion machine skid via the first coupling and the fusion machine skid pulls the rear skid via the second coupling. The preceding subject matter of this paragraph characterizes example 10 of the present disclosure.

The fusion machine skid, the forward skid, and the rear skid each comprise a forward raised lip. The preceding subject matter of this paragraph characterizes example 11 of the present disclosure, wherein example 11 also includes the subject matter according to example 10, above.

The first coupling comprises two tethers attached on a rear position of the forward skid at a single location and attached at two locations on a forward position of the fusion machine skid. The preceding subject matter of this paragraph characterizes example 12 of the present disclosure, wherein example 10 also includes the subject matter according to any one of examples 10-11, above.

The second coupling comprises two tethers attached on a rear position of the fusion machine skid at a single location and attached at two locations on a forward position of the rear skid. The preceding subject matter of this paragraph characterizes example 13 of the present disclosure, wherein example 13 also includes the subject matter according to any one of examples 10-12, above.

A method is disclose. The method includes placing a first pipe section on a first pipe stand, the first pipe stand positioned on a forward skid, an anterior portion of the first pipe section resting on the first pipe stand, wherein a posterior portion of the first pipe section rests on a pipe fusion machine, the pipe fusion machine positioned on a fusion machine skid. The method includes placing a second pipe section on the pipe fusion machine, an anterior portion of the second pipe section resting on the pipe fusion machine, wherein a posterior portion of the second pipe section rests on a second pipe stand positioned on a rear skid, wherein the forward skid is coupled to the fusion machine skid and the fusion machine skid is coupled to the rear skid. The method includes fusing the first pipe section to the second pipe section using the pipe fusion machine. The method further includes pulling the forward skid along the length of the first pipe section causing the forward skid, the fusion machine skid, and the rear skid to move forward along the fused pipe. The preceding subject matter of this paragraph characterizes example 14 of the present disclosure.

The pulling forward occurs until the anterior portion of the first pipe section rests on the pipe fusion machine and the posterior portion of the first pipe section rests on the second pipe stand positioned on the rear skid. The preceding subject matter of this paragraph characterizes example 15 of the present disclosure, wherein example 15 also includes the subject matter according examples 14, above.

The method further includes placing a third pipe section on the first pipe stand, an anterior portion of the third pipe section resting on the first pipe stand, wherein a posterior portion of the third pipe section rests on the pipe fusion machine. The preceding subject matter of this paragraph characterizes example 16 of the present disclosure, wherein example 16 also includes the subject matter according to any one of examples 14-15, above.

The method further includes fusing the third pipe section to the first pipe section using the pipe fusion machine. The preceding subject matter of this paragraph characterizes example 17 of the present disclosure, wherein example 17 also includes the subject matter according to any one of examples 14-16, above.

The method further includes pulling the forward skid along the length of the third pipe section causing the forward skid, the fusion machine skid, and the rear skid to move forward along the fused pipe until the anterior portion of the third pipe section rests on the pipe fusion machine and the posterior portion of the third pipe section rests on the second pipe stand positioned on the rear skid. The preceding subject matter of this paragraph characterizes example 18 of the present disclosure, wherein example 18 also includes the subject matter according to any one of examples 14-17, above.

The method further includes placing a fourth pipe section on the first pipe stand, an anterior portion of the fourth pipe section resting on the first pipe stand, wherein a posterior portion of the fourth pipe section rests on the pipe fusion machine. The preceding subject matter of this paragraph characterizes example 19 of the present disclosure, wherein example 19 also includes the subject matter according to any one of examples 14-18, above.

The method further includes fusing the fourth pipe section to the third pipe section using the pipe fusion machine. The preceding subject matter of this paragraph characterizes example 20 of the present disclosure, wherein example 20 also includes the subject matter according to any one of examples 11-19, above.

Other aspects and advantages of embodiments of the present invention will become apparent from the following detailed description, taken in conjunction with the accompanying drawings, illustrated by way of example of the principles of the invention.

DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

Throughout the description, similar reference numbers may be used to identify similar elements.

DETAILED DESCRIPTION

Figure 1:
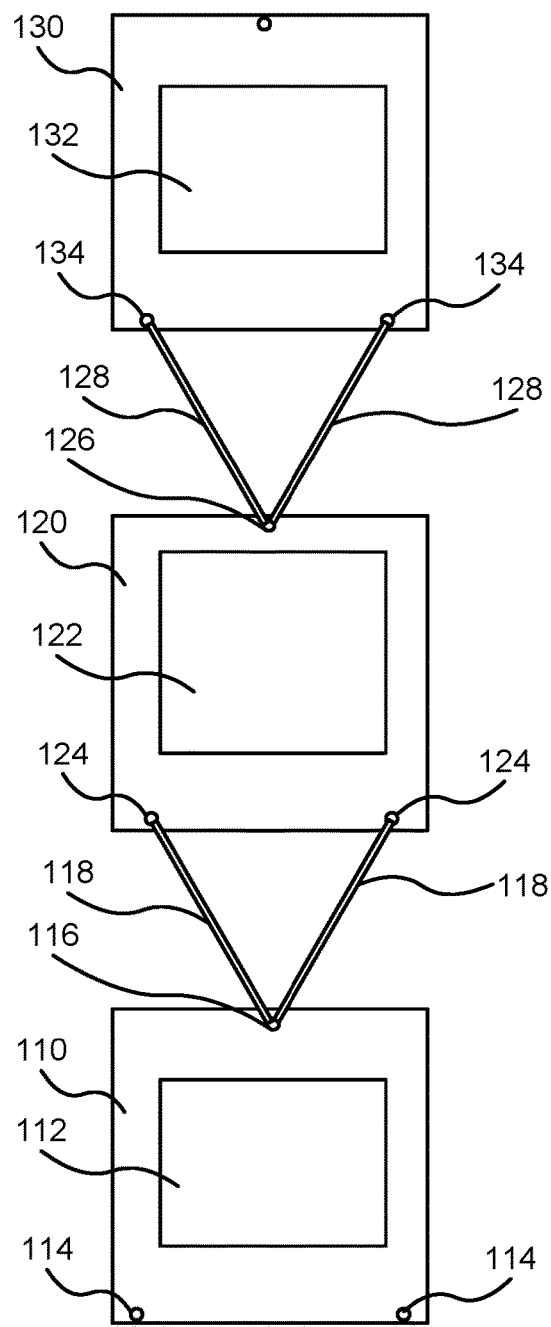
FIG. 1 depicts a top view of a mobile pipe fusion assembly system according to one or more embodiments of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Disclosed herein are embodiments of a mobile pipe fusing apparatus, system, and method that overcomes many of the deficiencies that are present in existing stationary pipe fusing machine setups. Embodiments include various features that help for a more efficient and consistent process to allow for quick and repeatable pipe fusion that eliminates time consuming teardown and reset processes and the dragging of pipe over long distances.

Various advantages are realized with many of the embodiments disclosed herein. Making the fusion mobile with an ability to travel along the location where the pipe is laid creates many benefits and advantages. An example of an advantage includes but is not limited to increased production, construction and efficiency. The increased production allows for more fusing to occur more rapidly and without long breaks that would normally be present for stationary systems. The industry standard and manufacturer guidelines are to set the fusion process up in a stationary manner. There is no need to stop the process, teardown, move and reset the process. Embodiments of the mobile system described herein has one fluid and forward direction of travel, rather than 4-6 or more movements to stop, tear down, rig, pick, transfer, and reset the process in a new location.

Another advantage and benefit of a mobile pipe fusion system includes safety. Embodiments described herein include skids that allow for the fusing machine to be set on a stable and mobile platform (skid), eliminating the need for movement, rigging, picking, transferring and resetting of the fusion machine. Each of these processes introduces unique and repetitive high risk activities. By reducing the number of times these processes occur or, in some cases, eliminating these processes altogether, safety is enhanced with less chances for injuries to occur.

Another advantage and benefit of embodiments described herein includes increased quality. Moving the mobile pipe fusing system along the pipe length while fusing the sections together allows for the maintaining alignment at all times. Maintaining alignment of the pipe as further sections are fused together reduces the chances for damage and scarring. Such damage and scarring may happen frequently during the pulling and dragging of pipe across different soils and rocks that needs to occur with a stationary pipe fusion setup. Damages that may occur need to be cut out or removed and re-fused or repaired. Such rework is costly and timely with a stationary system. In addition, the more fusions that occur in the piping can hurt the quality and lifespan of the laid pipe.

Embodiments described herein include a mobile pipe fusion assembly system. A mobile pipe fusion assembly system includes a fusion machine skid including a flat cross-sectional area whereon a pipe fusion machine rests, a forward skid including a flat cross-sectional area whereon a first pipe stand rests, and a rear skid including a flat cross-sectional area whereon a second pipe stand rests. The fusion machine skid is coupled to the forward skid by a first coupling. The fusion machine skid is coupled to the rear skid by a second coupling. The system is configured such that when the forward skid is pulled along a length of the pipe, the forward skid pulls the fusion machine skid via the first coupling and the fusion machine skid pulls the rear skid via the second coupling.

A skid may be a substantially flat bottom sled or platform that is configured to be dragged. The skid is configured to support substantial weight from either a pipe fusion machine or a pipe stand as well as the weight of the pipe sections themselves. The skid includes a flat cross-sectional area whereon either the pipe stand or the pipe fusion machine rests. In many embodiments, the skid is a rectangularly shaped platform. It may be constructed of any sturdy material that may have the strength to withstand heavy compressive and tensile loads. In some embodiments, the skid includes many connection points that allow for the coupling of either a pipe stand or a pipe fusion machine to the skid. Such connections allow for the pipe stand or the pipe fusion machine to stay securely coupled to the skid when the skid is pulled or dragged.

In many embodiments, a skid includes a raised or angled lip along the forward edge of the skid. Such a raised or angled lip allows for the skid to smoothly be dragged over debris (such as rocks) and works to keep such debris on the underside of the skid during the dragging process. This allows for a smoother dragging process.

In many embodiments, the skid includes coupling points on the forward and a rear edge of the skid. As described herein, the rear or rear edge is the posterior portion of the skid when the skid is being dragged. As described herein, the forward or forward edge is the anterior portion of the skid when the skid is being dragged. The coupling points may be drilled holes, eye nuts, welded rings, or any other similar type of coupling points to which a coupling may be secured. Such a coupling is configured to couple together two skids. As such, a coupling will be secured at that forward edge of one skid and the rear edge of another skid. Couplings may include heavy duty straps, metal cables, rods, chains, or other similar items that can securely couple together the skids. The coupling is secured at the coupling points of the respective skids.

In many embodiments, the forward coupling points are located along the forward edge of the skid or on the raised or angled lip of the skid. The rear coupling points are located along the rear edge of the skid. The coupling points allow for the securing of a strap, cable, rod, chain, or other similar coupling to the skid.

In some embodiments, there is a single coupling point on a particular edge of the skid. In many embodiments, there are multiple coupling points on a particular edge of the skid. In an exemplary implementation, the rear edge includes a single coupling point. The single coupling point is located approximately at the center of the read edge centered on the skid. The single coupling point may allow for more than one coupling to be secured to the single coupling point. Continuing the exemplary implementation, the forward edge includes two coupling points. The two coupling points are located approximately near the left and right corners of the skid on the forward edge. This allows for the skid to be pulled by two couplings. Such an exemplary implementation allows for the skid to be self-aligning as it is being dragged. The two couplings secured at the corners (and secured on their other ends to a single coupling point on a skid in front) along with the forward edge of the skid forms a triangular shape. The two couplings work such that each corner is dragged forward simultaneously allowing for the skid to stay in alignment with any other skid to which it is securely coupled.

An embodiment of an apparatus as described herein may include three skids coupled together with couplings (as described herein). Such an embodiment would include a forward skid, a middle (or a fusion machine) skid, and a rear skid. The three skids are coupled together in sequence. The forward skid and the rear skid are utilized to support pipe stands. The pipe stands are stands that are configured to support pipe sections. Pipe is constructed as pipe sections (small enough to allow for transportation to a site) are fused together two sections at a time. That is, a first pipe section is fused to a second pipe section. That now longer pipe section is then fused to a third pipe section. The now even longer pipe section is then fused to a fourth pipe section. This process is repeated over and over again until you have fused together a length of pipe sufficient for your need.

In an exemplary implementation described herein, a rear skid and rear pipe stand will support a pipe section or an already fused together longer pipe section. The rear skid will be spaced from the middle skid a sufficient distance to allow the pipe section to end at approximately the middle of the middle or fusion machine skid. The pipe section will be relatively centered and leveled because of the distance between the rear skid and the middle skid. The end of the pipe section will be sitting in the pipe fusion machine ready to be fused to a new pipe section. In the exemplary implementation, there is a forward skid in front of the middle skid with another pipe stand. The forward skid is spaced from the middle skid a sufficient distance to allow a new pipe section to be placed on the forward pipe stand with the end of the new pipe section sitting in the pipe fusion machine. The two ends of the pipe sections can be aligned and abutted together. With the pipe sections aligned, the two pipe sections are then fused together. Such fusion process is not described herein in detail. Neither is the pipe fusion machine. The pipe fusion machine uses known processes to fuse together the two pipe sections.

After the two pipe sections have been fused together a longer pipe section has now been formed. The apparatus can then be pulled or dragged forward. The apparatus is pulled or dragged forward by pulling or dragging the forward skid which in turn drags the middle skid which in turn drags the rear skid. The apparatus is pulled forward a sufficient distance until the leading edge of the longer pipe section is now centered in the pipe fusion machine. The longer pipe section is still supported by the rear pipe stand obviously. With the apparatus in this position, a new pipe section can be placed like before on the forward pipe stand with the end of the new pipe section sitting in the pipe fusion machine. The two ends of the pipe sections can be aligned and abutted together. With the pipe sections aligned, the two pipe sections are then fused together. After the two pipe sections have been fused together an even longer pipe section has now been formed. The process can then repeat itself over and over again as the apparatus is pulled forward and a new pipe section is placed and fused.

With regard to the rear of the pipe section, as the apparatus is pulled forward the fused together pipe section stays in place. That is, the pipe stands and the pipe fusion machine slide underneath and the pipe stays in place. As the rear skid and the rear pipe stand are pulled forward, the pipe will no longer be raised up by the pipe stand and will just fall gently onto the ground already in the desired location for the pipe. The pipe does not need to be dragged into place because is just set down in the finished location as the apparatus moves forward to fuse together more pipe sections. This allows for minimal damage to the pipe as it is being constructed and placed into position. Such a mobile fusion apparatus allows for the fusing together of extremely long pipes. The length of pipe is not limited as you can just keep pulling forward the apparatus and fusing additional pipe sections to the pipe.

An apparatus includes the skids and the couplings that couple together the skids. The skids are sized to be able to support the pipe stands and the pipe fusion machine. The apparatus includes any features that are present on the skids and couplings. A system includes the skids and couplings along with the machinery on top of the skids such as the pipe fusion machine and the pipe stands. The system may even further include the pipe sections themselves. In many embodiments, the pipe stands and the pipe fusion machine are securely coupled to the skids. The secure coupling allows for the skids to be pulled forward with pipe stands or pipe fusion machine secure. They will move forward with the skids leaving the pipe as the apparatus slides under the pipe.

Referring now to FIG. 1, a top view or view from above of a mobile pipe fusion assembly system 100 is depicted. The mobile pipe fusion assembly system 100 includes three skids, a forward skid 110, a middle or fusion machine skid 120, and a rear skid 130. As can be seen, the middle skid 120 is positioned between the forward skid 110 and the rear skid 130. The mobile pipe fusion assembly system 100 is shown without any pipe in this Figure to allow for ease of depiction and description.

Seated on the forward skid 110 is a first pipe stand 112. The first pipe stand 112 is a support stand or structure that is configured to support and align a pipe section. The first pipe stand 112 is depicted schematically. Also depicted on the forward skid 110 are two forward coupling points 114 and one rear coupling point 116. Although not shown, a truck or heavy equipment may be used to attach to the two forward coupling points 114 and pull the apparatus. The rear coupling point 116 has two couplings 118 that are secured to it. The two couplings 118 run from the forward skid 110 to the middle skid 120.

Seated on the middle skid 120 is a pipe fusion machine 122. The pipe fusion machine 122 is configured to support and align a pipe section and further include fusing equipment that is used to fuse together sections of pipe. The pipe fusion machine 122 is merely depicted schematically. Also depicted on the middle skid 120 are two forward coupling points 124 and one rear coupling point 126. The rear coupling point 126 has two couplings 128 that are secured to it. The two couplings 128 run from the middle skid 120 to the rear skid 130.

Seated on the rear skid 130 is a second or rear pipe stand 132. The second pipe stand 132 is a support stand or structure that is configured to support and align a pipe section. The second pipe stand 132 is depicted schematically. Also depicted on the rear skid 130 are two forward coupling points 134 on which the two couplings 128 are secured.

Figure 2:
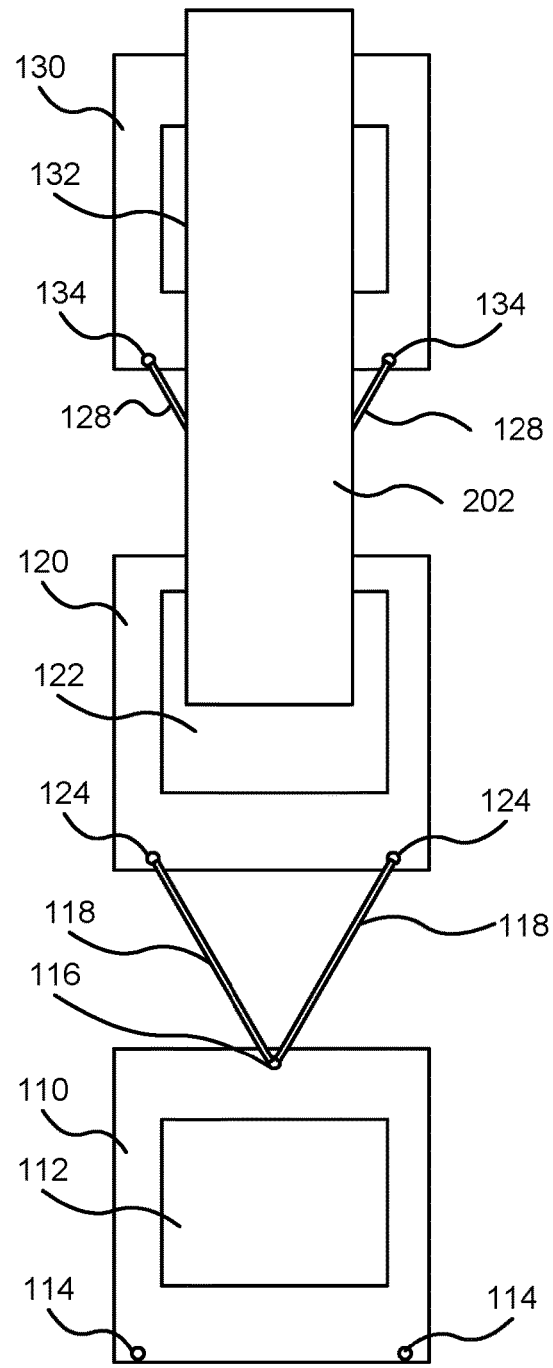
FIG. 2 depicts a top view of a mobile pipe fusion assembly system according to one or more embodiments of the present disclosure.

Referring now to FIG. 2, a top view or view from above of a mobile pipe fusion assembly system 100 is depicted. The mobile pipe fusion assembly system 100 is similar to the mobile pipe fusion assembly system 100 of FIG. 1 but with a rear pipe section 202 in place. The mobile pipe fusion assembly system 100 is ready for a forward pipe section to be set in place and fused to the rear pipe section 202.

Figure 3:
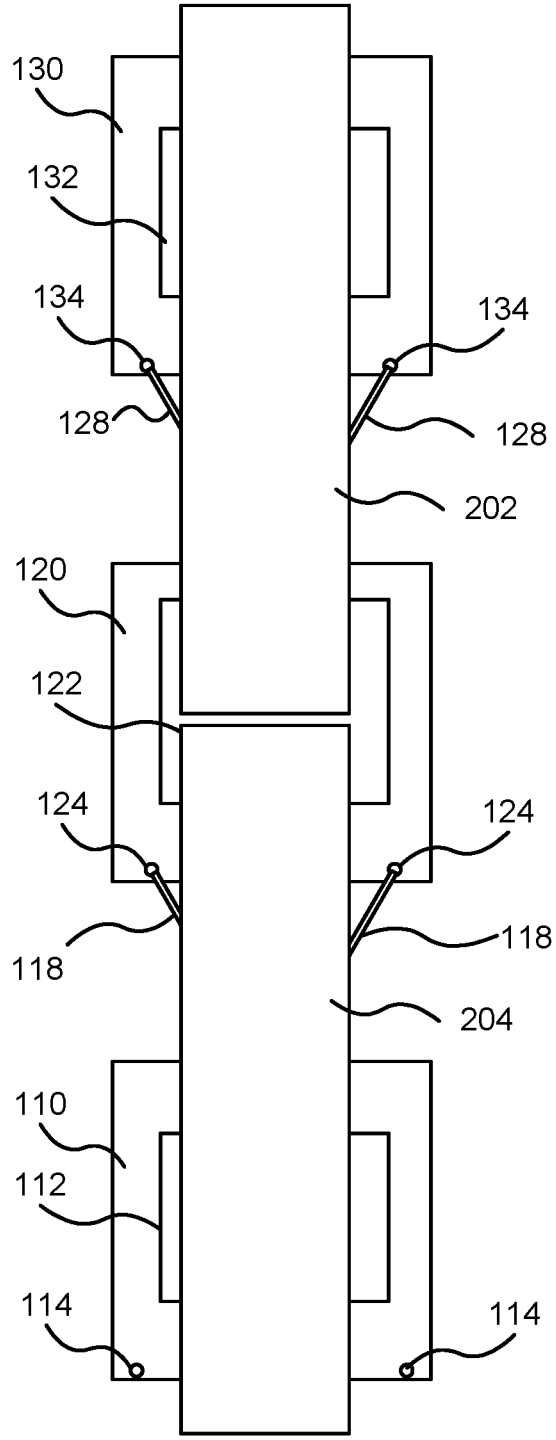
FIG. 3 depicts a top view of a mobile pipe fusion assembly system according to one or more embodiments of the present disclosure.

Referring now to FIG. 3, a top view or view from above of a mobile pipe fusion assembly system 100 is depicted. The mobile pipe fusion assembly system 100 is similar to the mobile pipe fusion assembly system 100 of FIGS. 1 and 2 but with a rear pipe section 202 and a forward pipe section 204 in place. A truck may carry the new pipe sections to the site and a crane may be used to place which is the forward pipe section 204 on the forward pipe stand 112 and the pipe fusion machine 122. The pipe sections may be fused in place.

Figure 4:
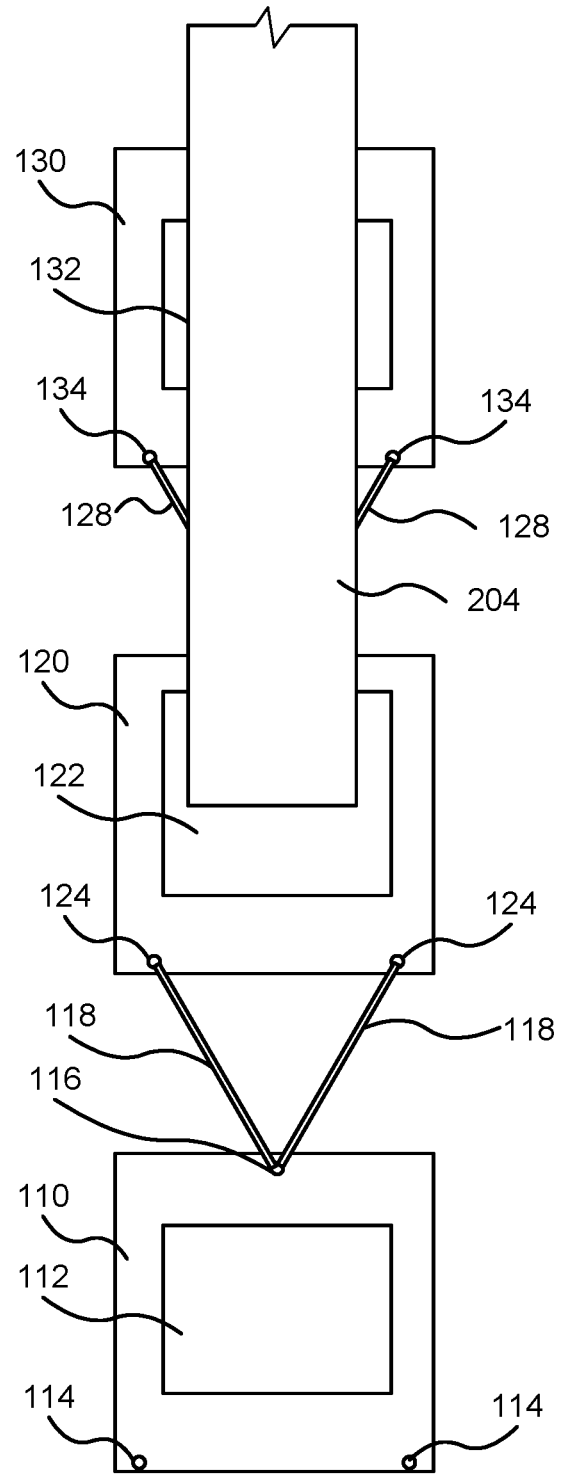
FIG. 4 depicts a top view of a mobile pipe fusion assembly system according to one or more embodiments of the present disclosure.

Referring now to FIG. 4, a top view or view from above of a mobile pipe fusion assembly system 100 is depicted. The mobile pipe fusion assembly system 100 is similar to the mobile pipe fusion assembly system 100 of FIGS. 1, 2, and 3 but with apparatus pulled forward so that the forward pipe section 204 (now fused into the pipe but numbered for clarity) in the rear position. The process can then repeat itself.

Figure 5A:
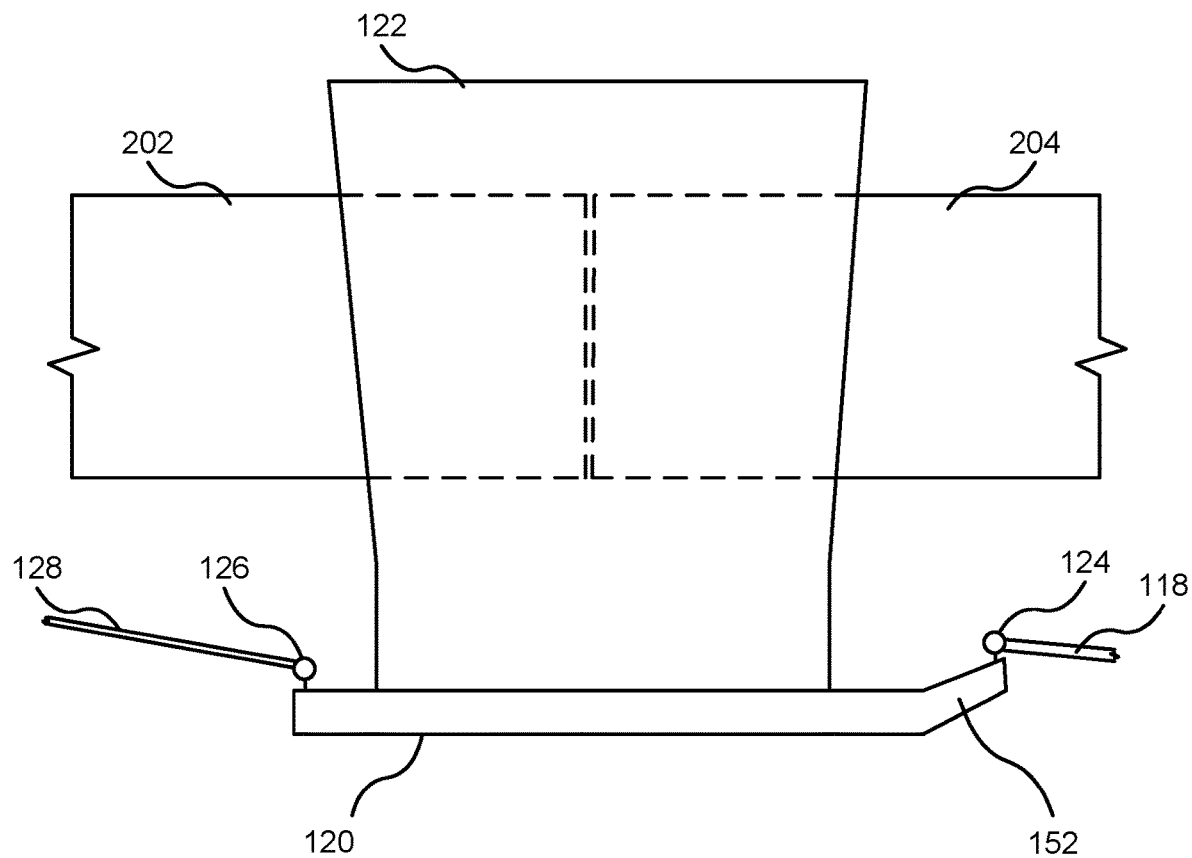
FIG. 5A depicts a side view of a middle skid of a mobile pipe fusion assembly system according to one or more embodiments of the present disclosure.
Figure 5B:
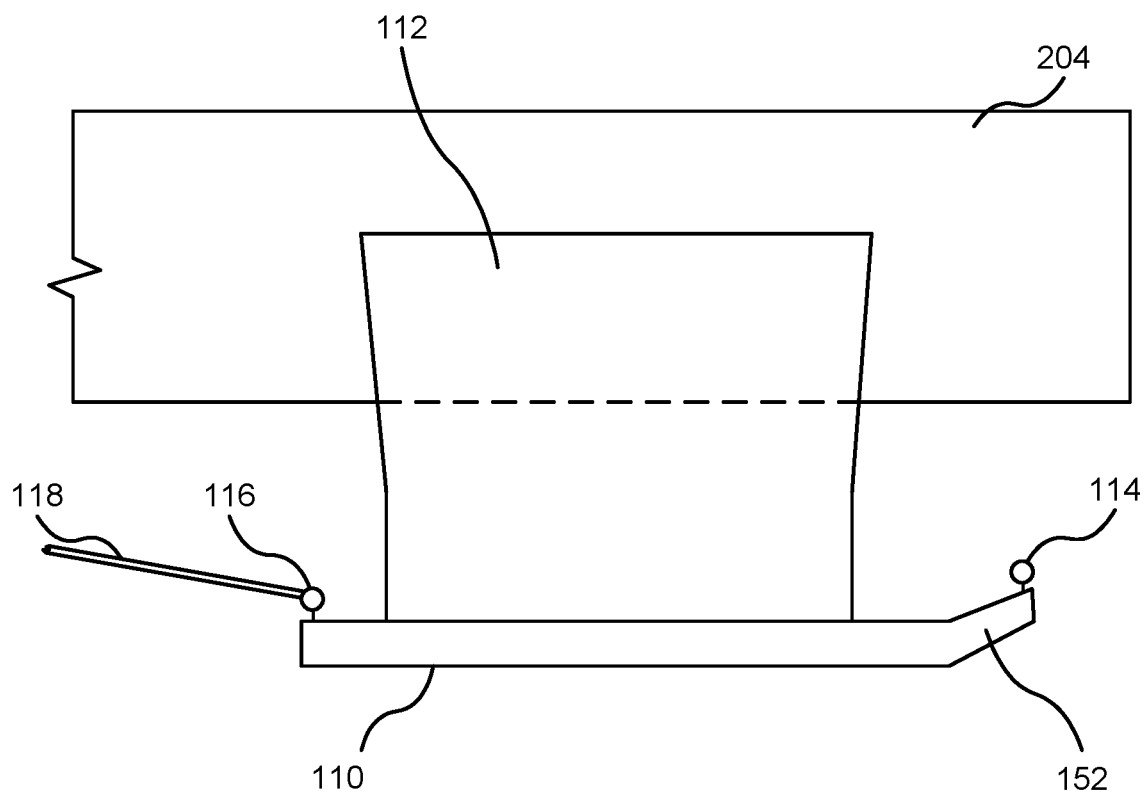
FIG. 5B depicts a side view of a forward skid of a mobile pipe fusion assembly system according to one or more embodiments of the present disclosure.
Figure 5C:
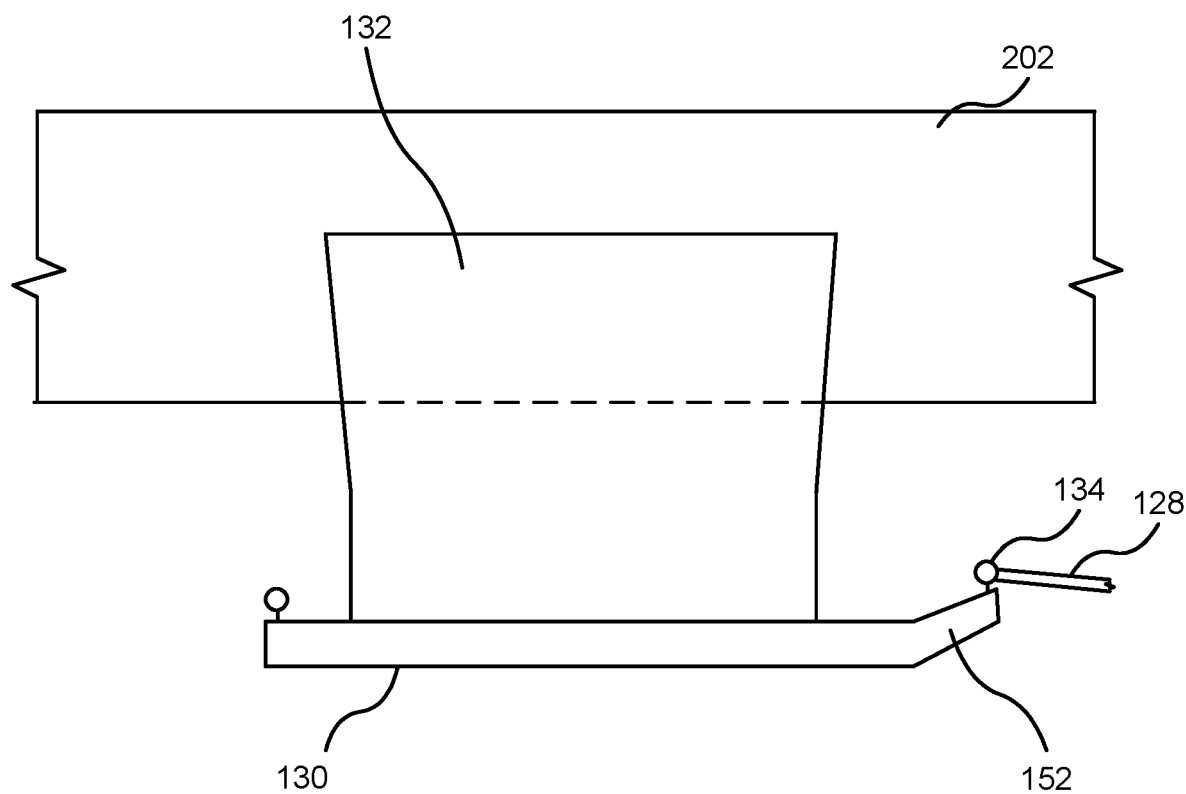
FIG. 5C depicts a side view of a rear skid of a mobile pipe fusion assembly system according to one or more embodiments of the present disclosure.

Referring to FIGS. 5A, 5B, and 5C, a side view of various sections of the mobile pipe fusion assembly system 100 is depicted. FIG. 5A depicts the middle skid 120 and associated components. FIG. 5B depicts the forward skid 110 and associated components. FIG. 5C depicts the rear skid 130 and associated components.

Referring to FIG. 5A, a side view of the middle skid 120 is depicted. As can be seen, the skid includes a substantially flat bottom surface that contacts the ground. The middle skid 120 is configured to support substantial weight from the pipe fusion machine 122 as well as the weight of the two pipe sections. The middle skid includes a flat cross-sectional area top surface whereon the pipe fusion machine 122 rests. In many embodiments, the middle skid 120 is a rectangularly shaped platform and the pipe fusion machine 122 is securely coupled to the skid with fasteners. The middle skid 120 includes connection points that allow for the coupling of the pipe fusion machine 122 to the skid 120. The middle skid 120 may be constructed of any sturdy material that may have the strength to withstand heavy compressive and tensile loads.

In the illustrated embodiment (and many embodiments), the middle skid 120 includes a raised or angled lip 152 along the forward edge of the skid. The raised or angled lip 152 allows for the skid 120 to smoothly be dragged over debris (such as rocks) and works to keep such debris on the underside of the skid 120 during the dragging process. The illustrated middle skid 120 includes coupling points 124 on the forward edge of skid. Couplings 118 are fastened or secured at the coupling points 124 and extend to the forward skid 110 (See FIG. 5B for reference). The coupling points may be drilled holes, eye nuts, welded rings, or any other type of connections to which the coupling 118 may be secured. The couplings 118 may include heavy duty straps, metal cables, rods, chains, or other similar items that can securely couple together two skids. The couplings 118 may be generally described as tethers.

In the illustrated embodiment, the forward coupling points 124 are located along the forward edge of the skid on the raised or angled lip 152 of the skid 120. The illustrated embodiment includes a rear coupling point 126 that is located along the rear edge of the skid 120. The rear coupling point 126 has couplings 128 fastened or secured to it. The couplings 128 extend to the rear skid 130 (see FIG. 5C for reference).

Also depicted in FIG. 5A, are a forward pipe section 204 that will run forward to the forward skid and forward pipe stand (see FIG. 5B) and a rear pipe section 202 that will run backwards to the rear skid and rear pipe stand (see FIG. 5C).

Although not shown, the middle skid 120 may also include a canopy covering. The canopy or canopy covering may cover and shield the pipe fusion machine 122. The covering may allow for the fusion process to occur in a more repeatable environment by protecting the fused joint from the elements such as wind, cold, heat, moisture, etc., each of which individually or collectively could affect the fusion process if not protected. In some embodiments, the canopy or canopy covering extends over and around the pipe and the pipe fusion machine 122. In some embodiments, the canopy or canopy covering is coupled directly to the skid 120. The canopy covering may facilitate the maintaining of a consistent temperature or humidity within the canopy covering. Other components may be included to monitor and affect the temperature or relative humidity within the canopy covering. A more repeatable environment for the fusing process will allow for a more consistent quality of work.

Referring to now to FIG. 5B, a side view of the forward skid 110 is depicted. As can be seen, the skid includes a substantially flat bottom surface that contacts the ground. The forward skid 110 is configured to support substantial weight from the pipe stand 112 as well as the weight of the forward pipe section 204. The forward skid 110 includes a flat cross-sectional area top surface whereon the pipe stand 112 rests. In many embodiments, the forward skid 110 is a rectangularly shaped platform and the pipe stand 112 is securely coupled to the skid with fasteners. The forward skid 110 includes connection points that allow for the coupling of the pipe stand 112 to the forward skid 110. The forward skid 110 may be constructed of any sturdy material that may have the strength to withstand heavy compressive and tensile loads.

In the illustrated embodiment (and many embodiments), the forward skid 110 includes a raised or angled lip 152 along the forward edge of the skid. The raised or angled lip 152 allows for the forward skid 110 to smoothly be dragged over debris (such as rocks) and works to keep such debris on the underside of the forward skid 110 during the dragging process. The illustrated forward skid 110 includes coupling points 114 on the forward edge of skid. Couplings may be fastened or secured at the coupling points 114 and extend to machinery (not shown) that is used to pull the apparatus and system. The coupling points may be drilled holes, eye nuts, welded rings, or any other type of connections to which a coupling may be secured. The couplings may include heavy duty straps, metal cables, rods, chains, or other similar items that can securely couple together the forward skid and the pulling machinery (a truck or other heavy machinery that can drag the apparatus forward).

In the illustrated embodiment, the forward coupling points 114 are located along the forward edge on the raised or angled lip 152 of the forward skid 110. The illustrated embodiment includes a rear coupling point 116 that is located along the rear edge of the forward skid 110. The rear coupling point 116 has couplings 118 fastened or secured to it. These couplings 118 extend to the middle skid 120 as was seen in FIG. 5A. Also depicted in FIG. 5B, is the forward pipe section 204 that will run backwards to the middle skid (See FIG. 5A).

Referring to now to FIG. 5C, a side view of the rear skid 130 is depicted. As can be seen, the skid includes a substantially flat bottom surface that contacts the ground. The rear skid 130 is configured to support substantial weight from the pipe stand 132 as well as the weight of the rear pipe section 202. The rear skid 130 includes a flat cross-sectional area top surface whereon the pipe stand 132 rests. In many embodiments, the rear skid 130 is a rectangularly shaped platform and the pipe stand 132 is securely coupled to the skid with fasteners. The rear skid 130 includes connection points that allow for the coupling of the pipe stand 132 to the rear skid 130. The rear skid 130 may be constructed of any sturdy material that may have the strength to withstand heavy compressive and tensile loads.

In the illustrated embodiment (and many embodiments), the rear skid 130 includes a raised or angled lip 152 along the forward edge of the skid. The raised or angled lip 152 allows for the rear skid 130 to smoothly be dragged over debris (such as rocks) and works to keep such debris on the underside of the rear skid 130 during the dragging process. The illustrated rear skid 130 includes coupling points 134 on the forward edge of skid. Couplings 128 may be fastened or secured at the coupling points 134 and extend to the middle skid 120 (See FIG. 5A). The coupling points may be drilled holes, eye nuts, welded rings, or any other type of connections to which a coupling may be secured. The couplings 1280 may include heavy duty straps, metal cables, rods, chains, or other similar items that can securely couple together the rear skid 130 and the middle skid 120.

In the illustrated embodiment, the forward coupling points 134 are located along the forward edge on the raised or angled lip 152 of the rear skid 130. Also depicted in FIG. 5C, is the rear pipe section 202 that will run forwards to the middle skid (See FIG. 5A).

Figure 6:
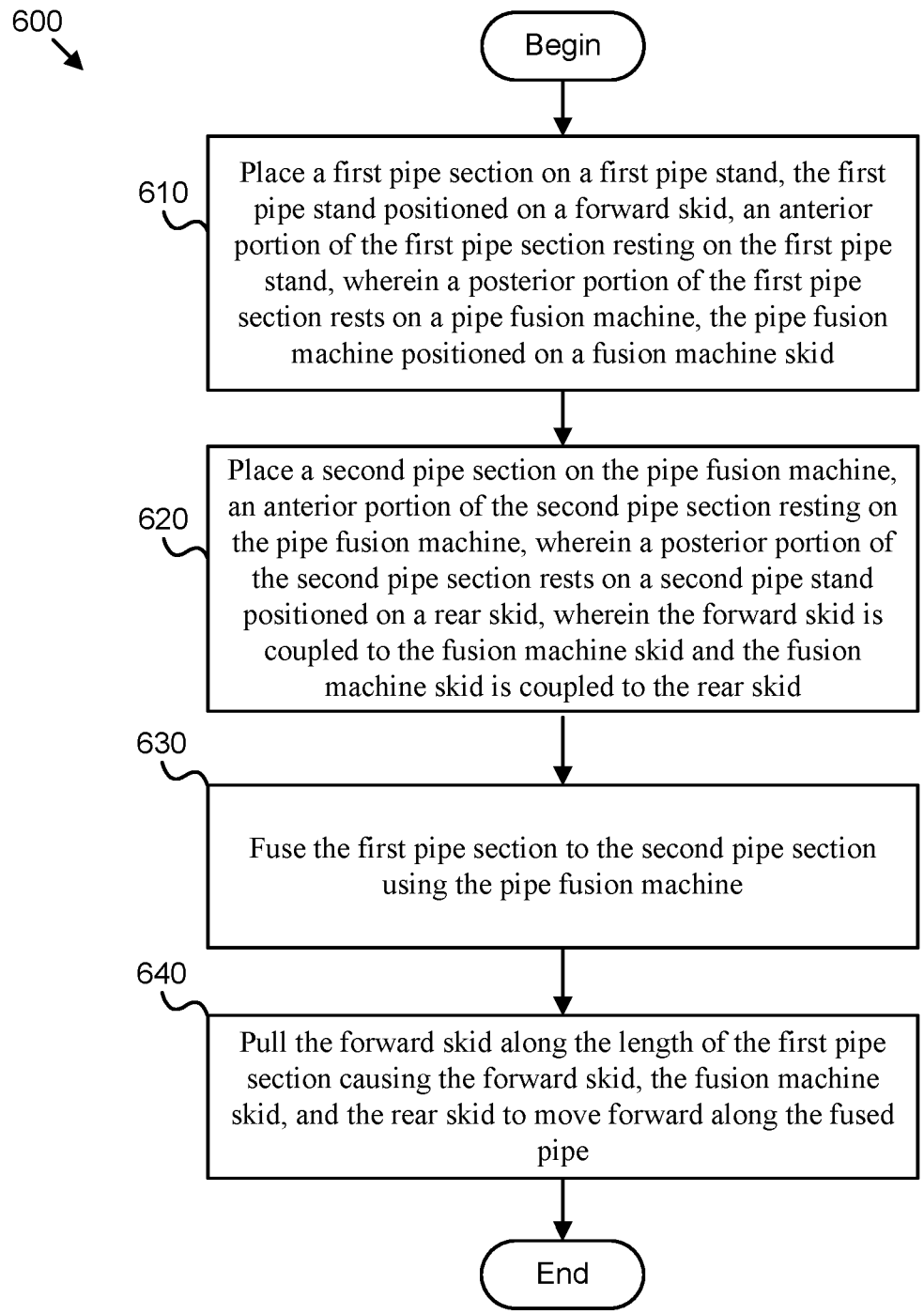
FIG. 6 depicts a block diagram of a method according to one or more embodiments of the present disclosure.

Referring now to FIG. 6, a flow chart diagram of a method 600 is depicted. The method 600 is a method for fusing pipe together using a mobile pipe fusing assembly. The method 600 includes, at block 610, placing a first pipe section on a first pipe stand, the first pipe stand positioned on a forward skid, an anterior portion of the first pipe section resting on the first pipe stand, wherein a posterior portion of the first pipe section rests on a pipe fusion machine, the pipe fusion machine positioned on a fusion machine skid.

The method 600 includes, at block 620, placing a second pipe section on the pipe fusion machine, an anterior portion of the second pipe section resting on the pipe fusion machine, wherein a posterior portion of the second pipe section rests on a second pipe stand positioned on a rear skid, wherein the forward skid is coupled to the fusion machine skid and the fusion machine skid is coupled to the rear skid. The method 600 includes, at block 630, fusing the first pipe section to the second pipe section using the pipe fusion machine.

The method 600 includes, at block 640, pulling the forward skid along the length of the first pipe section causing the forward skid, the fusion machine skid, and the rear skid to move forward along the fused pipe. The method then ends. The method may repeat some steps in an iterative manner while excluding some steps of the method.

In some embodiments, the pulling forward occurs until the anterior portion of the first pipe section rests on the pipe fusion machine and the posterior portion of the first pipe section rests on the second pipe stand positioned on the rear skid.

In some embodiments, the method further includes placing a third pipe section on the first pipe stand, an anterior portion of the third pipe section resting on the first pipe stand, wherein a posterior portion of the third pipe section rests on the pipe fusion machine.

In some embodiments, the method further includes fusing the third pipe section to the first pipe section using the pipe fusion machine.

In some embodiments, the method further includes pulling the forward skid along the length of the third pipe section causing the forward skid, the fusion machine skid, and the rear skid to move forward along the fused pipe until the anterior portion of the third pipe section rests on the pipe fusion machine and the posterior portion of the third pipe section rests on the second pipe stand positioned on the rear skid.

In some embodiments, the method further includes placing a fourth pipe section on the first pipe stand, an anterior portion of the fourth pipe section resting on the first pipe stand, wherein a posterior portion of the fourth pipe section rests on the pipe fusion machine.

In some embodiments, the method further includes fusing the fourth pipe section to the third pipe section using the pipe fusion machine.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Although the operations of the method(s) or processes herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A mobile pipe fusion assembly system, comprising:
    a fusion machine skid, the fusion machine skid comprising a flat cross-sectional area whereon a pipe fusion machine rests, the pipe fusion machine configured to fuse together a first pipe section and a second pipe section;
    a forward skid, the forward skid comprising a flat cross-sectional area whereon a first pipe stand rests, the first pipe stand configured to hold the first pipe section, wherein the fusion machine skid is coupled to the forward skid by a first coupling, wherein the forward skid comprises an angled lip at a forward edge of the flat cross-sectional area;
    a rear skid, the rear skid comprising a flat cross-sectional area whereon a second pipe stand rests, the second pipe stand configured to hold the second pipe section, wherein the fusion machine skid is coupled to the rear skid by a second coupling, wherein the rear skid comprises an angled lip at a forward edge of the flat cross-sectional area;
    wherein the system is configured such that when the forward skid is pulled along a length of the pipe, the forward skid pulls the fusion machine skid via the first coupling and the fusion machine skid pulls the rear skid via the second coupling.

2. The mobile pipe fusion assembly system of claim 1, further comprising the pipe fusion machine.

3. The mobile pipe fusion assembly system of claim 2, further comprising the first and second pipe stands, wherein the first pipe stand is coupled to the forward skid and the second pipe stand is coupled to the rear skid.

4. The mobile pipe fusion assembly system of claim 3, wherein the pipe fusion machine is coupled to the fusion machine skid.

5. The mobile pipe fusion assembly system of claim 1, wherein the fusion machine skid comprises a forward raised lip.

6. The mobile pipe fusion assembly system of claim 4, wherein the first coupling comprises two tethers attached on a rear position of the forward skid at a single location and attached at two locations on a forward position of the fusion machine skid.

7. The mobile pipe fusion assembly system of claim 5, wherein the second coupling comprises two tethers attached on a rear position of the fusion machine skid at a single location and attached at two locations on a forward position of the rear skid.

8. The mobile pipe fusion assembly system of claim 6, wherein the tethers are one of chains, straps, or cables that are configured to transfer a tensile load and do not transfer a compressive load.

9. The mobile pipe fusion assembly system of claim 8, further comprising a canopy covering the pipe fusion machine.

10. A mobile pipe fusion apparatus for fusing a pipe, comprising:
    a fusion machine skid, the fusion machine skid comprising a flat cross-sectional area whereon a pipe fusion machine rests, the pipe fusion machine configured to fuse together a first pipe section and a second pipe section;
    a forward skid, the forward skid comprising a flat cross-sectional area whereon a first pipe stand rests, the first pipe stand configured to hold the first pipe section, wherein the fusion machine skid is coupled to the forward skid by a first coupling, wherein the forward skid comprises an angled lip at a forward edge of the flat cross-sectional area;
    a rear skid, the rear skid comprising a flat cross-sectional area whereon a second pipe stand rests, the second pipe stand configured to hold the second pipe section, wherein the fusion machine skid is coupled to the rear skid by a second coupling, wherein the rear skid comprises an angled lip at a forward edge of the flat cross-sectional area; and
    wherein the system is configured such that when the forward skid is pulled along a length of the pipe, the forward skid pulls the fusion machine skid via the first coupling and the fusion machine skid pulls the rear skid via the second coupling.

11. The device of claim 10, wherein the fusion machine skid, the forward skid, and the rear skid each comprise a forward raised lip.

12. The device of claim 11, wherein the first coupling comprises two tethers attached on a rear position of the forward skid at a single location and attached at two locations on a forward position of the fusion machine skid.

13. The device of claim 12, wherein the second coupling comprises two tethers attached on a rear position of the fusion machine skid at a single location and attached at two locations on a forward position of the rear skid.

* * * * *